(No Model.)
D. C. CHIPMAN.
FLAX THRASHING MACHINE.
No. 491,237. Patented Feb. 7, 1893.
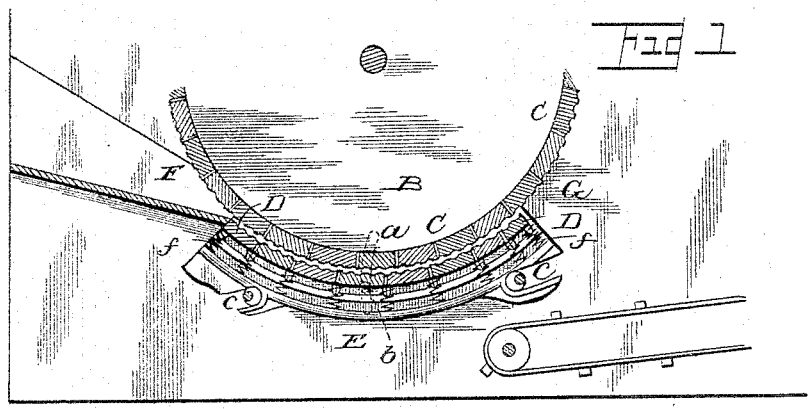
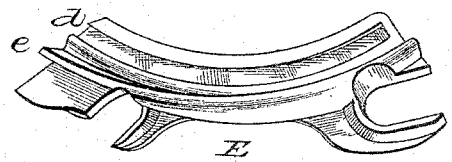
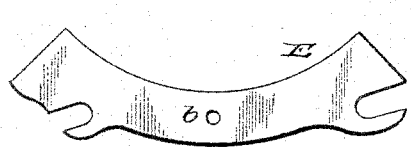
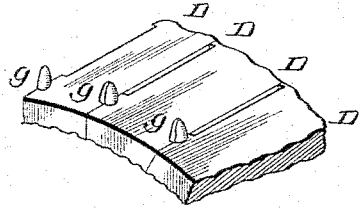
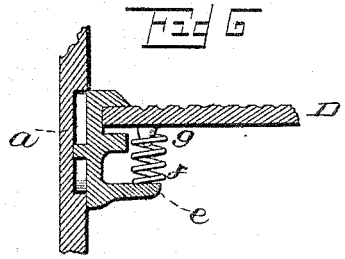
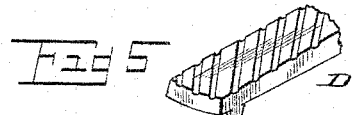
Witnesses
J. ... Divie
P. H. Bishop
Inventor
D. Clifton Chipman
By his Attorney
Sheldon A. Wood

United States Patent Office.

DE YOE CLIFTON CHIPMAN, OF PEORIA, ILLINOIS, ASSIGNOR TO THE PORT HURON ENGINE AND THRESHER COMPANY, OF PORT HURON, MICHIGAN.

FLAX-THRASHING MACHINE.

SPECIFICATION forming part of Letters Patent No. 491,237, dated February 7, 1893.

Application filed August 29, 1892. Serial No. 444,431. (No model.)

*To all whom it may concern:*

Be it known that I, DE YOE CLIFTON CHIPMAN, a citizen of the United States, residing at the city of Peoria, in the county of Peoria, State of Illinois, have invented certain Improvements in Flax - Thrashing Machines; and I do hereby declare the following to be a full, clear, and exact description of the invention, such as will enable others skilled in the art to which it appertains to make and use the same.

My invention relates to improvements in flax thrashing machines in which the cylinder is provided with fluted convex bars, corrugated upon their outer, or wearing surfaces, and runs over an elastic concave held in place by an improved adjustable concave holder or hanger.

The advantages I claim for my construction are:—(First.) The flax is thrashed without breaking the fibers of the stalks, for by my peculiar construction of cylinder, concave bars and concave hanger and support for the bars, the grain or seed is extracted without breaking the stalk fibers transversely. (Second.) The concave is elastic, and yielding, allowing the distance from the cylinder to continuously change. (Third.) While each concave bar is so hung and supported as to be separately and individually elastic, it is so connected with adjoining bars that no sharp edge is presented by the concave to break the straw. (Fourth.) All the bars are so connected that the passage of the straw gives an undulatory motion to the concave; it can grasp a large bundle and carry it through, and by its resiliency does equally good work when the unthrashed straw is inserted in smaller portions. (Fifth.) By my construction the elasticity and rigidity of the concave are easily changed, and the distance between cylinder and concave can be readily altered or adjusted. (Sixth.) If any bar in concave becomes broken or worn out, as flax thrashing machines were previously constructed it was necessary to unship the cylinder and take the machine apart. But by my construction the whole concave can be drawn out in front of the machine, and new bars inserted in place without removing either the cylinder or the concave hanger. I obtain these objects by the mechanism illustrated in the accompanying drawings in which, Figure 1 is a sectional upright view of the entire device. Fig. 2 is an exterior view of the concave hanger. Fig. 3 is an interior view of concave hanger, showing the side next to the cylinder, and the slot for the reception of concave bars, with shoulder for supporting the spiral springs which hold the concave bars. Fig. 4 is a view of a portion of three of the concave bars as seen from below and showing the nipples for retaining the spiral springs in place. Fig. 5 is a view of one end of a concave bar showing side which is next to cylinder, with the corrugations. Fig. 6 is a sectional view showing portion of concave bar, the concave hanger in position and side support at end of cylinder casing, with the slot for reception of nipple on concave hanger.

Similar letters refer to similar parts throughout the several views.

In Fig. 1, B is a revolving cylinder provided with corrugated plates, C, C, fastened thereto by bolts or suitable means. The concave hanger, E, is shown supported by the eccentrics, $c, c$. These eccentrics can be turned by means of the bolts upon which they are supported, and by this means the hanger can be elevated or lowered at either or both ends. The nipple, $b$, is cast upon the hanger and moves in a curved slot, $a$, in the casing at each end of the boxing of the machine which contains the cylinder. The concave bars, D, D are corrugated on their upper surfaces and are supported upon the hanger by spiral springs, $f, f$. Each spring supports the edges of two adjacent bars, except in the case of the outer extremity of the first and last bars, which must be supported by a spring as shown. By this construction, if the edge of any concave bar is depressed by the passing straw, the edge of the adjoining bar is also depressed and no projecting edge of a concave bar is elevated to tear and break the fibers of the flax. The flax is fed into the machine at F and passes from under the cylinder at G.

Fig. 2 shows the concave hanger viewed on the side farthest from cylinder. The nipple, $b$, is shown, which moves in the slot $a$ above described, when the position of the hanger is altered by means of the eccentrics above described.

In Fig. 3 an inside view of the hanger is given. The curved slot $d$ receives the concave bars. At any time the entire concave may be drawn out by sliding the bars out of the slot, $d$, to the front of the machine, and as easily replaced. The spiral springs supporting the concave rest upon the shoulder or bracket, $e$.

Fig. 4 gives a view of one end of the concave bars, as seen from lower side. Each bar, except the first and last, have divided nipples, $g$, $g$, $g$ as shown. The first and last, or outside bars, have complete nipples provided for the spiral springs which support the bars.

Fig. 5 shows one end of a concave bar, with corrugations, viewed on side next to cylinder, and shows one divided nipple, $g$.

Fig. 6 shows the concave hanger at one end of cylinder supporting a concave bar D. The spiral spring, $f$, rests upon shoulder, $e$, and embraces nipple, $g$, upon concave bar. The slot $a$ may be sunk in casing at side of machine at end of cylinder, as shown, or may extend entirely through the casing.

Having thus described my invention, what I claim and desire to secure by Letters Patent, is:—

The combination of the hangers having longitudinal flanges, the concave bars supported by the hangers with their edges in juxtaposition, whereby a continuous surface is presented to the flax, and provided with half nipples on their under sides at their edges, and a series of springs each having its lower end resting on the flange of the hanger and its upper end coiled around the half nipples at the adjacent edges of two adjoining concave bars.

In testimony whereof I affix my signature in presence of two witnesses.

D. Y. CLIFTON CHIPMAN.

Witnesses:
S. A. WOOD,
T. H. MILLS.